United States Patent [19]
Compoint et al.

[11] Patent Number: 5,625,464
[45] Date of Patent: Apr. 29, 1997

[54] CONTINUOUS TELEVISION TRANSMISSION REPRODUCTION AND PLAYBACK

[75] Inventors: Philippe Compoint; Paul-Louis Meunier; Alain Staron, all of Paris, France; Dietmar Uhde, Konigsfeld, Germany

[73] Assignee: Thomson Consumer Electronics, Courbevoie, France

[21] Appl. No.: 235,244

[22] Filed: Apr. 29, 1994

Related U.S. Application Data

[63] Continuation of Ser. No. 768,184, filed as PCT/FR91/00179 Mar. 5, 1991, abandoned.

[30] Foreign Application Priority Data

Mar. 16, 1990 [FR] France ................... 90 03385

[51] Int. Cl.⁶ ................ H04N 5/76; H04N 5/781
[52] U.S. Cl. .................. 386/95; 360/18; 369/32; 369/111; 386/70; 386/125
[58] Field of Search ................ 358/342, 335, 358/310; 369/32, 109, 111; 360/19.1, 33.1, 18; H04N 5/76, 5/78, 5/781, 5/782, 5/783, 5/92, 5/85, 9/79

[56] References Cited

U.S. PATENT DOCUMENTS 3,766,328 10/1973 Warren .
3,793,639 2/1974 Enz, et al. .
4,774,597 9/1988 Harvey .
4,787,063 11/1988 Mugnet .................... 358/335
4,841,502 6/1989 Murakami et al. .
4,879,611 11/1989 Fukui et al. ................. 358/335
4,991,025 2/1991 Eigeldinger ................ 358/335
5,016,273 5/1991 Hoff ........................ 358/335
5,027,222 6/1991 Shinbo et al. ............. 360/19.1
5,029,014 7/1991 Lindstrom .................. 358/86
5,111,299 5/1992 Aoki et al. ................ 358/335
5,132,807 7/1992 Takimoto et al. ........... 358/335
5,134,499 7/1992 Sata et al. ................ 358/335
5,175,624 12/1992 Hieda et al. .............. 358/906

FOREIGN PATENT DOCUMENTS

0375764B1 11/1993 European Pat. Off. .
3242558 7/1984 Germany ............ H04N 5/13
9001838 2/1990 WIPO .

*Primary Examiner*—Thai Q. Tran
*Attorney, Agent, or Firm*—Oblon, Spivak, McClelland, Maier & Neustadt, P.C.

[57] ABSTRACT

A receiver/recorder of television transmissions is disclosed which operates automatically on a stand-by basis to record continuously television transmissions from at least one channel onto a reusable large capacity recording medium such as a magnetooptic disk. The recording is accomplished without user intervention and the system includes an indexing for distinguishing a recent recording from an older recording which is partially overlapped by the recent recording.

15 Claims, 1 Drawing Sheet

CONTINUOUS TELEVISION TRANSMISSION REPRODUCTION AND PLAYBACK

This application is a Continuation of application Ser. No. 07/768,184, filed Oct. 16, 1991, abandoned, which was filed as International Application No. PCT/FR91/00179 on Mar. 5, 1991.

BACKGROUND OF THE INVENTION

Discussion of the Background

The video recorder is nowadays a very widespread machine. It is above all used to view cassettes pre-recorded by specialised editors. In general these machines allow the automatic recording of television transmissions and, for this purpose, have available means for programming such recordings in advance. However the programming of a video recorder involves operations which are often considered complex by the user; furthermore care must be taken that a cassette is in fact inserted into the machine. This is why video recorders are used less to record television transmissions than to view prerecorded cassettes.

SUMMARY OF THE INVENTION

The invention aims to facilitate the recording of television transmissions or the viewing of such transmissions subsequently.

The receiver/recorder according to the invention is characterised in that it comprises means by which the machine is constantly on standby (or active) so as to continuously record television transmissions from at least one channel on to a (reusable) reversible recording medium of large capacity.

With such a machine, the user need not perform programming operations. In general it will be sufficient for him to leave it connected to the mains so that it remains on standby. However, a simplified programming may be provided which consists in selecting the channel(s) to be recorded. It then suffices for example to allocate each channel a key and the control of the recorder is then as easy as that of a simple television set. Preferably the machine according to the invention is configured to allow the simultaneous recording of several channels.

According to another of its aspects, the invention relates to a machine for receiving and recording television transmissions which is characterised in that it comprises means by which the machine is constantly on standby so as to continuously record television transmissions from at least one channel onto a random-access reversible recording medium associated with writing and reproduction means ensuring wear-free exploration of the storage area of the medium, the recording of transmissions being performed without the intervention of a user in such a way as to have available upon reproduction a sufficiently sizeable segment of transmission(s) to enable the viewing and/or the recording subsequently and in full of one at least of the transmissions.

In order to allow the machine to continue writing information at the place at which it stopped, in particular after its supply is cut off, in a preferred embodiment an indexing is provided for distinguishing a recent recording from an older recording partially overlapped by the recent recording.

To minimise the risks of an error of operation (or of use) it is preferable for the medium not to be easily removable from the machine, as in a recorder (or computerised memory) with hard disk.

Preferably a recording is only performed when a transmission is present. This is why, in an embodiment, the machine comprises a means of detecting the presence of transmissions. This detector consists, for example, of an element for identifying the presence of the line-scan frequency.

Since the recording medium has a limited capacity there is provision for a detection of filling of the memory constituted by this medium which, when the memory is completely filled, commands stoppage of the recording or return to the beginning of the memory so as to erase the information written at the beginning and replace it with new information.

The recorder part is preferably a recorder of magnetooptic type, the recording medium being in the form of a disk. The advantage of such a recorder is, on the one hand, that the medium and the recording/reading head suffer no mechanical wear since there is no contact between these components, and on the other hand, that the magnetic materials used in magnetooptic disks are infinitely reversible (reusable). Moreover, a magnetooptic disk has a large capacity and several disks may be provided within one recorder.

In what follows, unless otherwise stated, reference will be made solely to a recorder of magnetooptic type.

For choosing transmissions to be viewed, a means of fast advance is provided in order to rapidly locate the beginning of the transmission selected by the user.

Preferably the recorder/reader comprises two heads, the one for recording and the other for reading, and means allowing the reading head and the recording head to be used independently of one another. In this way it is then possible—by using separate areas of the medium—to record a received transmission while viewing (on a screen), independently, an already recorded transmission.

Although, as explained above, the, main object of the invention is to facilitate operation of the recorder, the same programming options as with a conventional video recorder may however be provided in combination with the continuous recording. Thus, in an embodiment a programming means is provided for recording a specified later transmission and means so that this transmission is afterwards retained in memory when rerecording on the information medium.

A clock may be associated with the recorder in order to continuously write date information associated with the television transmissions. In this way it is afterwards possible to reach the beginning of a transmission almost immediately by displaying the date of this beginning, the search being performed in the same way as for the beginning of a fragment of recording in a (audio or video) disk of compact type.

In an embodiment, the magnetooptic reader/recorder comprises two writing heads, one for continuous recording and the other for resiting already recorded transmissions in another location of the memory.

According to another of its aspects, which can be used independently of the other aspects, the invention relates to a machine for recording data on a medium, for example of magnetic or magnetooptic type, which is characterised in that it comprises a means for periodically writing to the medium a code representing a filling of this medium, this code being the same upon a specified filling and varying when returning to the beginning of the recording of the medium, that is to say when a later writing is performed.

According to yet another of its aspects, which can be used independently of the other aspects, the invention relates to a machine for recording data onto a medium, for example of magnetic or magnetooptic type, which is characterised in that, since it is supplied with current from the mains, it comprises a backup energy source such as a buffer accumulator of low capacity, means of detecting an interruption in supply and means, supplied by the backup source, for writing a code for stopping the recording at the location of the medium being written to.

BRIEF DESCRIPTION OF THE DRAWINGS

Other characteristics and advantages of the invention will emerge with the description of some of its embodiments, this description being made with reference to the attached drawings in which.

DETAILED DESCRIPTION OF THE PREFERRED EMBODIMENTS

In all the examples the recording medium is of magnetooptic type in the form of a rotating disk 10 with vertical axis 11.

Figure 1:
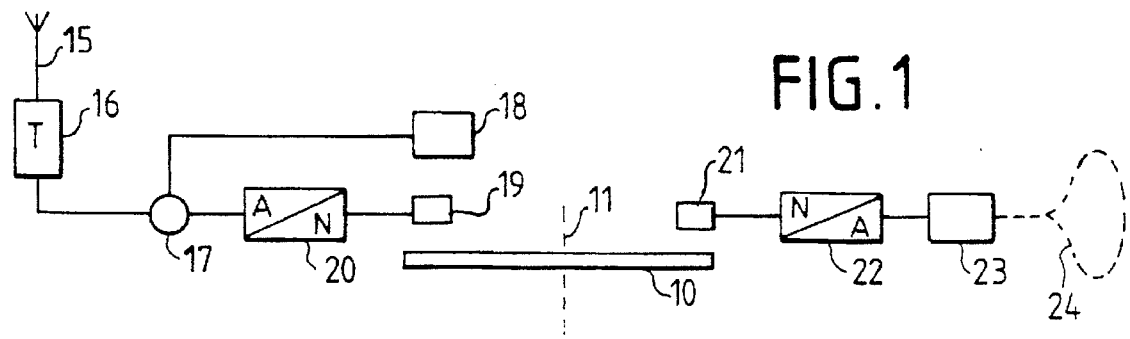
FIG. 1 is a diagram of a machine according to the invention.

Referring now to FIG. 1: the recorder/reader receives television transmissions via an antenna 15 or a cable. In conventional manner it comprises a tuner 16 associated with means of sound and picture demodulation and intended to receive a television transmission via a channel. Such a circuit is conventional in television receivers or video recorders.

At the output of the tuner 16, a component 17 is provided which detects the presence, or the absence, of line-frequency signals and whose role is to control a recording-control unit 18. If a transmission is detected, the unit 18 allows recording and transmits the output signals from the tuner 16 to a recording head 19 via an analog/digital converter 20.

In the absence of received transmissions the component 17 suppresses operation of the recorder.

The machine also comprises a reading head 21 distanced from the recording head 19 so that the magnetic field produced by the recording head does not disturb reading.

The reading head 21 is connected to a digital/analog converter 22 and to conventional circuits 23 for viewing pictures on a television tube 24 and for sound reproduction.

For the recording part, the machine does not in principle include any control in the user's range. The machine operates, that is to say records transmissions, so long as it is supplied with electrical energy.

By contrast for reproduction, the machine includes the usual controls of a television receiver with, moreover, the option of reading the recording starting from any desired area of the disk. In this case the control is that conventionally found in a compact disk reader or in a videodisk reader.

In a variant, recording, and hence reading, are performed similarly.

Recording starts for example from the centre and finishes at the edge of the disk. When the disk has been completely written, the recording head 19 returns to the centre of the disk and erases the previously recorded transmissions and writes the new ones. As a variant, when the disk is completely filled, an automatic control acting on the circuit 18 is provided in order to interrupt recording. This interruption is conveyed for example by the lighting up of an indicator light on the front of the machine. To restart recording a reset button is pushed.

In order to allow for interruptions in electrical energy supply, such as mains failures, a system of coding the information is provided which, with each turn of the disk, writes an item of information, for example a binary digit, and this item of information changes when the recording is taken up again at the beginning of the disk. Thus, upon the first filling with each rotation the digit 0 is allocated, upon the second filling with each turn the digit 1 is allocated, upon the third filling with each turn the digit 0 is allocated again, etc.

Figure 4:
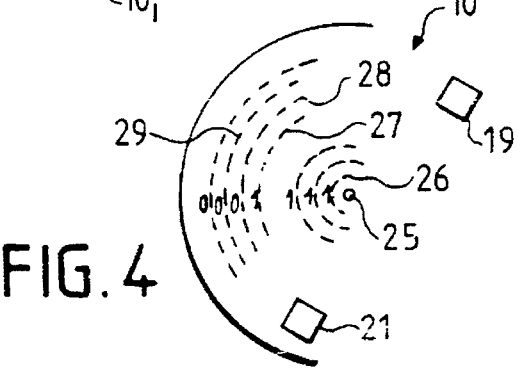
FIG. 4 is a diagram of a recorded disk.

In FIG. 4 has been represented a disk 10 on which recording has been started from the centre 25, and with each turn 26 the digit 1 is allocated. The last turn written has the reference 27. Later on, the succeeding turns 28, 29 etc., also contain recordings. However the latter are allocated the binary digit 0 corresponding to the preceding filling.

In this way, in the event of an interruption in the electrical energy supply, the head 19 for recording and reading is able to determine the place, namely turn 27, on the disk at which the recording finished since it is the last turn (starting from the centre) of index 1.

In a variant the machine comprises a backup energy source such as a buffer accumulator (not shown) of small capacity which allows operation of the machine to continue for a specified, relatively short time, for example 30 seconds. During this delay period a circuit allows an item of information to be written at the place where the recording is performed. When the supply picks up again,, the recorded code is easily recognisable.

In the example the coding of television transmissions is performed similarly to the MAC/PACKET coding as far as the sound and the separating of the luminance and the chrominance are concerned. However, in contrast to the MAC standards, the video information is recorded in digital form and not in analog form. Thus, in the course of one line, the digital sound information is firstly transmitted, then the digital chrominance information and finally the digital luminance information.

As a variant the recording is done in analog form.

In addition to, or in place of, the detector 17 for recognising a television signal at the line frequency, a component (not shown) is provided for recognising a pilot signal furnished by the transmitter and representing the beginning of a television transmission.

Figure 2:
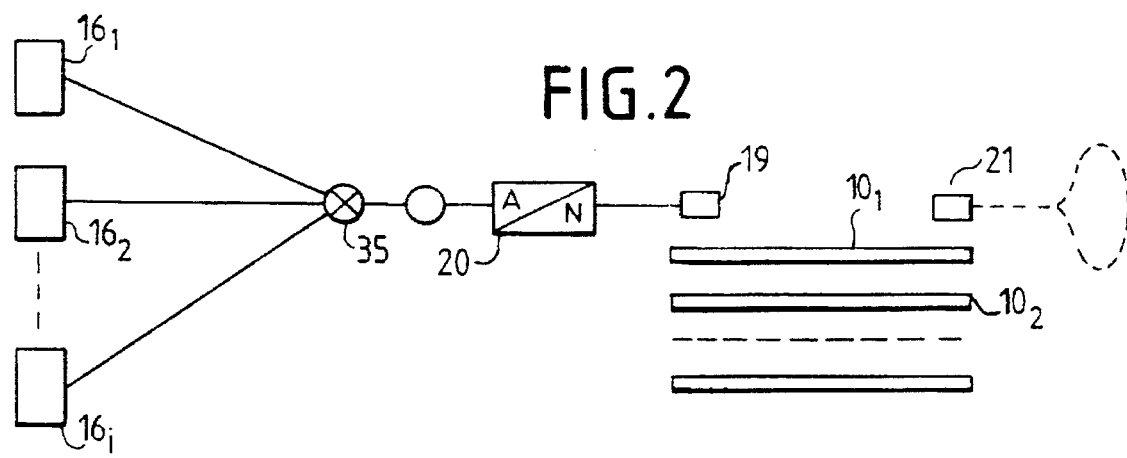
FIGS. 2 and 3 are figures similar to the diagram of FIG. 1 for variants.

In the embodiment represented in FIG. 2, the machine is intended to allow the simultaneous recording of several television channels. For this purpose it comprises a number i of receiver sections with tuners $16_1$, $16_2$ . . . $16_i$ equal to the number of channels which it is desired to receive and several disks $10_1$, $10_2$, etc., increasing the recording capacity.

In this example the signals furnished by the sections with tuners $16_1$, $16_2$, . . . to the analog/digital converter 20 pass through a multiplexer 35. In this way it is possible to simultaneously record several television channels on one disk $10_1$ and there is then provision for just one recording head 19 and just one reading head 21. When a disk $10_1$ is completely filled with information, a mechanism allows the recording head 19 to be moved from the disk $10_1$ to the succeeding disk $10_2$. Likewise a transfer mechanism is provided to allow the reading head 21 to be moved to another disk.

Figure 3:
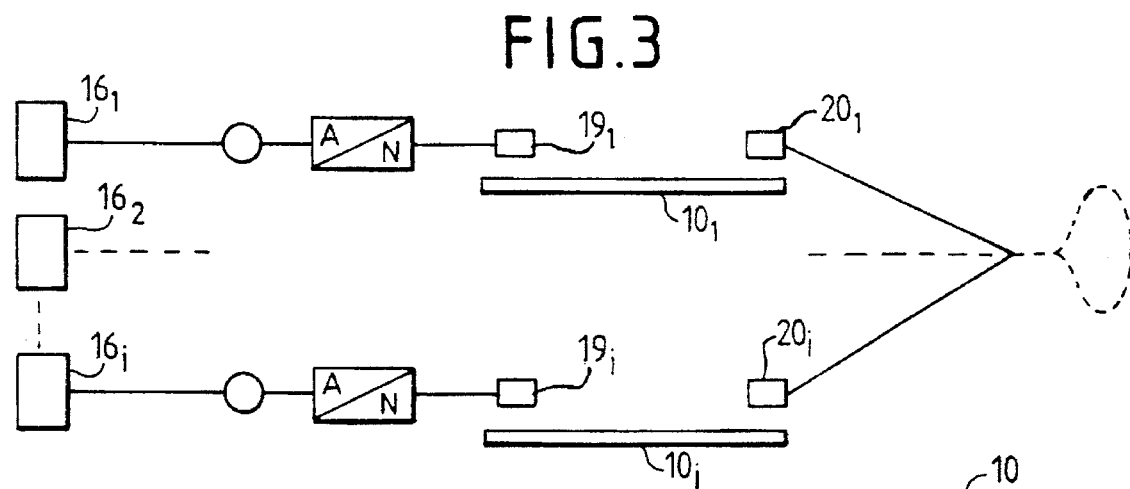

In the example represented in FIG. 3, the number of recording heads $19_1$, $19_2$, etc. . . . $19_i$ is equal to the number of sections with tuners $16_1, 16_2 \ldots 16_i$. In this case the number of disks $10_1, 10_2 \ldots 10_i$ is the same, each disk being allocated one recording head. Likewise each disk is allocated one reading head $21_1 \ldots 21_i$.

With this embodiment it is not necessary to provide a multiplexer as for the example of FIG. 2.

Whatever the embodiment, it is advantageous to provide for the recording head 19 to allow the viewing of the transmission which is being recorded, for example by inlaying in the picture read with the reading head or in the picture received directly by the tuner.

We claim:

1. An apparatus for receiving and recording television transmissions, comprising:

means for continuously recording television transmissions from at least one channel onto a random-access rewritable recording medium wherein said means for recording provides for a continuous recording of received television transmission;

means for reproducing said recorded television transmission;

means for detecting a complete filling of said recording medium and providing a first signal fed to a return means to return a recording head to the beginning of said medium in order to rewrite subsequent transmissions at the beginning of said medium while simultaneously erasing transmissions which were previously recorded and providing a complete filling indication signal;

means for periodically writing to said medium a code representing a filling of said medium wherein said code remains the same until a specified filling is completed and wherein said code is changed to a second value when the recording head is returned to the beginning of the medium;

indexing means responsive to said code wherein said indexing means is recorded on said medium for automatically distinguishing a first in time recorded transmission from a second in time recorded transmission.

2. The apparatus according to claim 1 further comprising a means for detecting said code and a means which, after an interruption, provides for continuation of recording following the last location containing said second code value found at the beginning of the medium.

3. The apparatus according to claim 1 further comprising a backup energy source and a means for detecting an interruption in a supply current and means, supplied by said backup energy source, for writing a code indicating where the recording has stopped.

4. The apparatus according to claim 1 including a recording head and a separate reading head.

5. The apparatus according to claim 1 comprising a means of control for simultaneously recording at least two television channels.

6. The apparatus according to claim 1 wherein said recording medium comprises at least one disk.

7. The apparatus according to claim 5 wherein said recording medium comprises at least two disks.

8. The apparatus according to claim 1 further including a clock for continuously recording date information simultaneous with said television transmissions.

9. The apparatus according to claim 8 further comprising a means of fast searching from said date information.

10. The apparatus according to claim 8 including a means for preventing erasure of preselected transmissions between two predetermined dates.

11. The apparatus according to claim 1 further comprising a means for detecting the presence of television transmissions and an element responsive to said means for detecting the presence of television transmissions to control recording of said transmissions.

12. The apparatus according to claim 11 wherein said means for detecting the presence of television transmissions includes a means for detecting the presence of absence of line-frequency signals.

13. The apparatus according to claim 1 wherein said code is a binary code.

14. The apparatus for recording data comprising:

means for continuously recording said data onto a random access rewritable recording medium wherein said means for recording provides for continuous recording of received data;

means for periodically writing to said medium a code representing a filling of said medium wherein said code remains the same until a specified filling is completed and wherein said code is automatically changed to a second value when the recording head is returned to the beginning of the medium.

15. The apparatus according to claim 14 further comprising a means for detecting said code and a means which, after an interruption, provides for continuation of recording following the last location containing said second code value found at the beginning of said medium.

* * * * *